US012398268B2

(12) United States Patent
Montanari et al.

(10) Patent No.: US 12,398,268 B2
(45) Date of Patent: Aug. 26, 2025

(54) MULTILAYER STRUCTURE BASED ON RECYCLED POLYAMIDE

(71) Applicant: ARKEMA FRANCE, Colombes (FR)

(72) Inventors: Thibaut Montanari, Serquigny (FR); Bertrand Verbauwhede, Serquigny (FR); Thierry Vasselin, Tokyo (JP); Pierre Nidercorn, Grindorff-Bizing (FR)

(73) Assignee: ARKEMA FRANCE, Puteaux (FR)

( * ) Notice: Subject to any disclaimer, the term of this patent is extended or adjusted under 35 U.S.C. 154(b) by 403 days.

(21) Appl. No.: 17/999,132

(22) PCT Filed: May 18, 2021

(86) PCT No.: PCT/FR2021/050858
§ 371 (c)(1),
(2) Date: Nov. 17, 2022

(87) PCT Pub. No.: WO2021/234265
PCT Pub. Date: Nov. 25, 2021

(65) Prior Publication Data
US 2023/0193025 A1 Jun. 22, 2023

(30) Foreign Application Priority Data
May 19, 2020 (FR) ....................... 2005007

(51) Int. Cl.
C08L 77/04 (2006.01)
B32B 1/08 (2006.01)
B32B 7/02 (2019.01)
B32B 7/12 (2006.01)
B32B 27/08 (2006.01)
B32B 27/20 (2006.01)
B32B 27/22 (2006.01)
B32B 27/34 (2006.01)
F16L 11/04 (2006.01)

(52) U.S. Cl.
CPC ............... C08L 77/04 (2013.01); B32B 1/08 (2013.01); B32B 7/02 (2013.01); B32B 7/12 (2013.01); B32B 27/08 (2013.01); B32B 27/20 (2013.01); B32B 27/22 (2013.01); B32B 27/34 (2013.01); F16L 11/04 (2013.01); B32B 2250/24 (2013.01); B32B 2272/00 (2013.01); B32B 2307/704 (2013.01); B32B 2597/00 (2013.01); C08L 2205/025 (2013.01); C08L 2205/035 (2013.01); C08L 2205/06 (2013.01); C08L 2207/20 (2013.01)

(58) Field of Classification Search
CPC ............... C08L 77/04; C08L 2205/025; C08L 2205/035; C08L 2205/06; C08L 2207/20; C08L 77/02; C08L 77/10; C08L 77/00; B32B 1/08; B32B 7/02; B32B 7/12; B32B 27/08; B32B 27/20; B32B 27/22; B32B 27/34; B32B 2250/24; B32B 2272/00; B32B 2307/704; B32B 2597/00; B32B 2250/03; B32B 2307/558; F16L 11/04; C08K 5/0016; C08K 5/057
See application file for complete search history.

(56) References Cited

U.S. PATENT DOCUMENTS

| 2002/0142118 A1 | 10/2002 | Schmitz |
| 2004/0265527 A1 | 12/2004 | Schmitz et al. |

FOREIGN PATENT DOCUMENTS

| CN | 1378913 A | 11/2002 |
| EP | 0342066 A1 | 11/1989 |
| EP | 0428833 A2 | 5/1991 |
| EP | 1162061 A1 | 12/2001 |
| EP | 1216826 A2 | 6/2002 |
| EP | 1452307 A1 | 9/2004 |
| EP | 1741549 A1 | 1/2007 |
| EP | 2098580 A1 | 9/2009 |
| EP | 3299165 A1 | 3/2018 |
| JP | 2002210904 A | 7/2002 |
| JP | 2003042351 A | 2/2003 |
| JP | 2005028877 A | 2/2005 |
| JP | 2014240145 A | 12/2014 |
| WO | 2005102681 A1 | 3/2008 |

OTHER PUBLICATIONS

International Search Report (PCT/ISA/210) with English translation and Written Opinion (PCT/ISA/237) mailed on Sep. 10, 2021, by the European Patent Office as the International Searching Authority for International Application No. PCT/FR2021/050858.

(Continued)

Primary Examiner — Michael C Miggins
(74) Attorney, Agent, or Firm — Boone IP Law

(57) ABSTRACT

A multilayer tubular structure for transporting fluids for a motor vehicle, including at least three layers: at least one layer having a composition predominantly including at least one semi-crystalline aliphatic polyamide, the composition having at least 50% of recycled material from a multilayer tube that has been intended for transporting fluids for a motor vehicle, the tube having a composition which predominantly includes at least one polyamide, at least one layer having a composition predominantly including at least one semi-crystalline aliphatic polyamide and optionally at least one impact modifier, and when the layer has a composition predominantly including at least one semi-crystalline aliphatic polyamide that is PA12 and/or PA612 and/or PA1010, then the composition includes the impact modifier, and at least one layer having a composition predominantly including at least one semi-crystalline aliphatic polyamide, the layer and the layer each having at least 90% of non-recycled material.

19 Claims, No Drawings

(56) References Cited

OTHER PUBLICATIONS

Office Action (with English translation) mailed on Apr. 1, 2025, by the Japanese Patent Office (JPO) for Japanese Application No. 2022570574, 18 pages.

MULTILAYER STRUCTURE BASED ON RECYCLED POLYAMIDE

DISCLOSURE

Every year, several million cars are scrapped around the world. An end-of-life vehicle (ELV) contains many toxic and polluting products (liquids or solids): oil, battery, air conditioning fluid, explosive features of airbags, etc. If treated in the wrong way, this waste can lead to soil and water pollution, as well as accidents. ELVs are therefore considered hazardous waste.

A large amount of vehicle components can be recovered and recycled as used parts or raw materials. Parts intended for reuse (headlights, turn signals, engine, radiator, starter, hood, fenders, doors, etc.) are dismantled and stored for resale.

Frames and non-recyclable parts (ferrous and non-ferrous metals, plastics, glass, rubber, etc.) are shredded for recycling or landfill.

The European Directive 2000/53/EC on end-of-life vehicles has set a reuse and recovery rate of 95% by weight per vehicle from 2015.

Only 5% final waste, i.e. waste that cannot be treated under the technical and economic conditions of the moment and that will be incinerated or evacuated to specific storage centers, should therefore remain.

The 95% reused and recovered are processed for:
Energy recovery: use of waste (oil, tires, plastics, etc.) as a means of producing energy, by direct incineration with or without other waste;
Material recovery: Reuse: new use of a part that keeps the same use and is not transformed, or Recycling: operation aiming at introducing materials coming from waste into the production cycle, as a total or partial replacement for virgin material.

A motor vehicle contains a large number of pipes, especially pipes for transporting fluids such as air, oil (e.g. for cooling the transmission oil cooler), water, urea solution, glycol coolant, fuel such as gasoline, in particular bio-gasoline or diesel, in particular bio-diesel, or hydrogen.

These pipes can be single-layer and/or multilayer tubular structures, in particular based on polyamide(s).

When the motor vehicle is at end-of-life, the various pipes present in it are generally very degraded or too much so to be reused as such, in the form of a tube, without risk or without it leading to excessively degraded properties of use.

Indeed, the tubes, especially under the engine hood, are placed in a severe thermo-oxidative environment due to the heat generated by the engine, which can typically reach 150° C., and to the presence of air and therefore oxygen. Each 10° C. increase in temperature typically results in a halving of tube life as well as degradation of certain additives in the tubes such as stabilizers.

Furthermore, a fuel transport hose, for example a polyamide hose that contains a plasticizer, has lost most of its plasticizer by the time it reaches its end of life, and the polyamide initially present has depolymerized and/or degraded and has lost most of its stabilizers, which prohibits its safe reuse.

Until now, the end-of-life automotive pipe has not been reused and is often incinerated, but this contributes to global warming, the reduction of which has become one of the major issues of the 21$^{st}$ century In addition, several car manufacturers have a long-term goal of recycling 100% of the vehicles they produce in order to achieve zero environmental impact.

Therefore, the supply of recycled pipe to these manufacturers becomes essential and enables reducing the amount of pipe to be thrown away or incinerated.

The present invention therefore relates to a multilayer tubular structure (MLT) for transporting fluids for a motor vehicle, in particular air, oil (e.g. for cooling the transmission oil cooler, or TOC), water, urea solution, glycol coolant, or a fuel such as gasoline, in particular alcohol-based gasoline, bio-gasoline or diesel, in particular bio-diesel, or hydrogen, comprising at least three layers:

at least one layer (1) consisting of a composition comprising at least 50% of polyamide resins consisting of at least one first polyamide resin predominantly comprising aliphatic units and at least one second resin predominantly comprising aromatic units,
  said composition consisting of at least 50% of recycled material from a multilayer tube that has been intended for transporting fluids for a motor vehicle, in particular as defined above, said tube consisting of a composition that predominantly comprises at least one polyamide,
at least one layer (2) consisting of a composition predominantly comprising at least one semi-crystalline aliphatic polyamide and optionally at least one impact modifier, and when the layer (2) consists of a composition predominantly comprising at least one semi-crystalline aliphatic polyamide that is PA12 and/or PA612 and/or PA1010, then said composition comprises said impact modifier, and
at least one layer (2') consisting of a composition predominantly comprising at least one semi-crystalline aliphatic polyamide,
said layer (2) and said layer (2') consisting of at least 90% of non-recycled material.

The inventors have therefore surprisingly found that a layer based on polyamide resins consisting of at least one first polyamide resin predominantly comprising aliphatic units and at least one second resin predominantly comprising aromatic units, and consisting of at least 50% recycled material, especially embedded between two polyamide-based layers and consisting of non-recycled material, allows the constitution of a multilayer tubular structure comprising at least three layers capable of transporting a fluid for motor vehicles, in particular air, oil, water, a urea solution, a glycol-based coolant, or a fuel such as gasoline, in particular bio-gasoline or diesel, in particular bio-diesel, or hydrogen, regardless of the type of fluid initially transported by the recycled multilayer tube constituting the embedded layer.

In other words, the present invention relates to a multilayer tubular structure (MLT) for transporting fluids for a motor vehicle, in particular air, oil (e.g. for cooling the transmission oil cooler, or TOC), water, urea solution, glycol coolant, or a fuel such as gasoline, in particular alcohol-based gasoline, bio-gasoline or diesel, in particular bio-diesel, or hydrogen, comprising at least three layers:

at least one layer (1) consisting of a composition comprising at least 50% of polyamide resins consisting of at least one first polyamide resin predominantly comprising aliphatic units and at least one second resin predominantly comprising aromatic units,
  said composition consisting of at least 50% of recycled material from a multilayer tube that has been intended for transporting fluids for a motor vehicle, in particular as defined above, said tube consisting of a composition that predominantly comprises at least one polyamide,
at least one layer (2) consisting of a composition predominantly comprising at least one semi-crystalline aliphatic polyamide and optionally at least one impact modifier, and when the layer (2) consists of a composition predominantly comprising at least one semi-crystalline aliphatic polyamide that is PA12 and/or PA612 and/or PA1010, then said composition comprises said impact modifier, and at least one layer (2') consisting of a composition predominantly comprising at least one semi-crystalline aliphatic polyamide, said layer (2) and said layer (2') consisting of at least 90% of non-recycled material.

The single-layer and/or multi-layer tube that originally transported fluids for motor vehicles from which the recycled material comes is therefore a used tube that has already transported said fluid at least for several months, in particular several years.

The single-layer and/or multilayer tube that initially transported fluids therefore excludes a virgin tube.

The term "fluid" refers to a gas or liquid used in the motor vehicle, in particular air, oil, water, urea solution, glycol coolant, or a fuel such as gasoline, in particular alcoholized gasoline, bio-gasoline or diesel, in particular bio-diesel, or hydrogen.

Advantageously, said fluid refers to fuels, in particular gasoline, in particular alcoholized gasoline, bio-gasoline or diesel, in particular bio-diesel.

The term "gasoline" refers to a mixture of hydrocarbons derived from the distillation of petroleum to which additives or alcohols such as methanol and ethanol may be added, with alcohols being the major components in some cases.

"Alcoholized gasoline" means gasoline to which methanol or ethanol has been added. It also refers to E95 gasoline that does not contain petroleum distillate.

The term "polyamide-based" means at least 50% by weight of polyamide in the layer.

The phrase "a composition predominantly comprising at least one polyamide . . . " means at least 50% by weight of said polyamide in the composition.

In one embodiment, said layer (2) consists of a composition predominantly comprising at least one semi-crystalline aliphatic polyamide and at least one impact modifier in a proportion of 3 to 45% by weight with respect to the total weight of the composition.

Regarding Layer (1)

The layer (1) consists of a composition comprising at least 50% of polyamide resins consisting of at least one first polyamide resin predominantly comprising aliphatic units and at least one second resin predominantly comprising aromatic units, said composition consisting of at least 50% recycled material from a multi-layer tube that has been used to transport fluids for a motor vehicle.

The nomenclature used to define the polyamides is described in ISO standard 1874-1:2011 "Plastics—Polyamide (PA) Moulding And Extrusion Materials—Part 1: Designation" and is well known to a skilled person.

The term "polyamide" according to the invention refers equally to a homopolyamide or to a copolyamide.

The term "a first polyamide resin predominantly comprising aliphatic units" means that said first resin comprises at least 50% aliphatic units.

The term "a second polyamide resin predominantly comprising aromatic units" means that said first resin comprises at least 50% aromatic units.

In one embodiment, said first polyamide resin predominantly comprising aliphatic units is a semi-crystalline polyamide.

Advantageously, said first polyamide resin predominantly comprising aliphatic units is a semi-crystalline aliphatic polyamide.

In another embodiment, said second resin predominantly comprising aromatic units is a semi-crystalline polyamide.

Advantageously, said first polyamide resin predominantly comprising aromatic units is a semi-crystalline semi-aromatic polyamide.

In yet another embodiment, said first polyamide resin predominantly comprising aliphatic units and said second resin predominantly comprising aromatic units are semi-crystalline polyamides.

Advantageously, said first polyamide resin predominantly comprising aliphatic units is a semi-crystalline aliphatic polyamide and said first polyamide resin predominantly comprising aromatic units is a semi-crystalline semi-aromatic polyamide.

The expression "semi-crystalline polyamide" within the meaning of the invention throughout the description refers to polyamides that have a melting temperature (Tm) and an enthalpy of fusion $\Delta H > 25$ J/g, in particular $>40$ J/g, especially $>45$ J/g, as well as a glass-transition temperature (Tg) as determined by DSC according to ISO standards 11357-1:2016 and 11357-2 and 3:2013 at a heating rate of 20 K/min.

Said at least one aliphatic semi-crystalline polyamide is obtained from the polycondensation of at least one lactam, or from the polycondensation of at least one amino acid, or from the polycondensation of at least one Xa diamine with at least one Yb dicarboxylic acid.

When said at least one semi-crystalline aliphatic polyamide is obtained from the polycondensation of at least one lactam, said at least one lactam may be selected from a C6 to C18 lactam, preferentially C10 to C18, more preferentially C10 to C12. A C6 to C12 lactam is especially decanolactam, undecanolactam, and lauryllactam.

When said at least one semi-crystalline aliphatic polyamide is obtained from the polycondensation of at least one lactam, it may therefore comprise a single lactam or several lactams.

Advantageously, said at least one semi-crystalline aliphatic polyamide is obtained from the polycondensation of a single lactam and said lactam is selected from lauryllactam and undecanolactam, advantageously lauryllactam.

When said at least one semi-crystalline aliphatic polyamide is obtained from the polycondensation of at least one amino acid, said at least one amino acid may be selected from a C6 to C18 amino acid, preferentially C10 to C18, more preferentially C10 to C12.

A C6 to C12 amino acid is especially 6-aminohexanoic acid, 9-aminononanoic acid, 10-aminodecanoic acid, 10-aminoundecanoic acid, 12-aminododecanoic acid and 11-aminoundecanoic acid and derivatives thereof, especially N-heptyl-11-aminoundecanoic acid.

When said at least one semi-crystalline aliphatic polyamide is obtained from the polycondensation of at least one amino acid, it may therefore comprise a single amino acid or several amino acids.

Advantageously, said semi-crystalline aliphatic polyamide is obtained from the polycondensation of a single amino acid and said amino acid is selected from 11-aminoundecanoic acid and 12-aminododecanoic acid, advantageously 11-aminoundecanoic acid.

When said at least one semi-crystalline aliphatic polyamide is obtained from the polycondensation of at least one C4-C36, preferentially C5-C18, preferentially C5-C12, more preferentially C10-C12, Xa diamine with at least one C4-C36, preferentially C6-C18, preferentially C6-C12, more preferentially C10-C12, Yb diacid, then said at least one Xa diamine is an aliphatic diamine and said at least one Yb diacid is an aliphatic diacid.

The diamine may be linear or branched. Advantageously, it is linear.

Said at least one C4-C36 Xa diamine can be in particular selected from 1,4-butanediamine, 1,5-pentamethylenediamine, 1,6-hexamethylenediamine, 1,7-heptamethylenediamine, 1,8-octamethylenediamine, 1,9-nonamethylenediamine, 1,10-decamethylenediamine, 1,11-undecamethylenediamine 1,12-dodecamethylenediamine, 1,13-tridecamethylenediamine, 1,14-tetradecamethylenediamine, 1,16-hexadecamethylenediamine and 1,18-octadecamethylenediamine, octadecenediamine, eicosanediamine, docosanediamine and the diamines obtained from fatty acids.

Advantageously, said at least one Xa diamine is C5-C18 and selected from 1,5-pentamethylenediamine, 1,6-hexamethylenediamine, 1,7-heptamethylenediamine, 1,8-octamethylenediamine, 1,9-nonamethylenediamine, 1,10-decamethylenediamine 1,11-undecamethylenediamine, 1,12-dodecamethylenediamine, 1,13-tridecamethylenediamine, 1,14-tetradecamethylenediamine, 1,16-hexadecamethylenediamine and 1,18-octadecamethylenediamine.

Advantageously, said at least one C5 to C12 Xa diamine is in particular selected from 1,5-pentamethylenediamine, 1,6-hexamethylenediamine, 1,7-heptamethylediamine, 1,8-octamethylediamine, 1,9-nonamethylediamine, 1,10-decamethylediamine, 1,11-undecamethylediamine, and 1,12-dodecamethylediamine.

Advantageously, said at least one C6 to C12 Xa diamine is in particular selected from 1,6-hexamethylenediamine, 1,7-heptamethylediamine, 1,8-octamethylediamine, 1,9-nonamethylediamine, 1,10-decamethylediamine, 1,11-undecamethylediamine, and 1,12-dodecamethylediamine.

Advantageously, the Xa diamine used is a C10 to C12 diamine, in particular selected from 1,10-decamethylediamine, 1,11-undecamethyleniamine, and 1,12-dodecamethylediamine.

Said at least one C4 to C36 Yb dicarboxylic acid may be selected from succinic acid, glutaric acid, adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid, and diacids obtained from fatty acids.

The diacid may be linear or branched. Advantageously, it is linear.

Advantageously, said at least one Yb dicarboxylic acid is C6 to C18 and is selected from adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid.

Advantageously, said at least one Yb dicarboxylic acid is C6 to C12 and is selected from adipic acid, suberic acid, azelaic acid, sebacic acid, undecanedioic acid, and dodecanedioic acid.

Advantageously, said at least one Yb dicarboxylic acid is C10 to C12 and is selected from sebacic acid, undecanedioic acid and dodecanedioic acid.

When said semi-crystalline aliphatic polyamide is obtained from the polycondensation of at least one Xa diamine with at least one Yb dicarboxylic acid and may therefore comprise a single diamine or a plurality of diamines and a single dicarboxylic acid or several dicarboxylic acids.

Advantageously, said semi-crystalline aliphatic polyamide is obtained from the polycondensation of a single Xa diamine with a single Yb dicarboxylic acid.

Said at least one semi-aromatic semi-crystalline polyamide is obtained from the polycondensation of at least one Xa diamine as defined above, with at least one aromatic dicarboxylic acid or a Xb diamine with a Yb dicarboxylic acid as defined above.

The aromatic dicarboxylic acid is advantageously selected from terephthalic acid (denoted T), isophthalic acid (denoted I) and 2,6-naphthalene dicarboxylic acid (denoted N) or mixtures thereof; in particular it is selected from terephthalic acid (denoted T), isophthalic acid (denoted I) or mixtures thereof.

The Xb diamine is advantageously an arylamine, which can be chosen from meta-xylylene diamine (MXD, CAS No. 1477-55-0) or para-xylylene diamine (PXD, CAS No.: 539-48-0).

When said semi-crystalline semi-aromatic polyamide is obtained from the polycondensation of at least one Xa diamine with at least one aromatic dicarboxylic acid, or of at least one Xb diamine with at least one Yb dicarboxylic acid, it may therefore comprise a single diamine or a plurality of diamines and a single dicarboxylic acid or several dicarboxylic acids.

Advantageously, said semi-crystalline aliphatic polyamide is obtained from the polycondensation of a single Xa diamine with a single aromatic dicarboxylic acid or from the polycondensation of a single Xb diamine with a single Yb dicarboxylic acid.

Advantageously, said semi-aromatic semi-crystalline polyamide is obtained from the polycondensation of at least one Xa diamine with at least one dicarboxylic acid selected from terephthalic acid and isophthalic acid, especially terephthalic acid, or said semi-aromatic semi-crystalline polyamide is obtained from the polycondensation of at least one Xb diamine with at least one Yb dicarboxylic acid.

In particular said at least one C6-C12 Xa diamine is selected from 1,6-hexamethylenediamine, 1,7-heptamethylediamine, 1,8-octamethylediamine, 1,9-nonamethylediamine, 1,10-decamethylediamine 1,11-undecamethylediamine, 1,12-dodecamethylediamine and said at least one dicarboxylic acid is an acid selected from terephthalic acid and isophthalic acid, especially terephthalic acid.

In particular, said at least one Xb diamine is an arylamine, which can be chosen from meta-xylylene diamine (MXD, CAS No. 1477-55-0) or para-xylylene diamine (PXD, CAS No.: 539-48-0) and said at least one Yb dicarboxylic acid is C6 to C18 and is selected from adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid.

Advantageously, said at least one Yb dicarboxylic acid is C6 to C12 and is selected from adipic acid, suberic acid, azelaic acid, sebacic acid, undecanedioic acid, and dodecanedioic acid.

Each of these semi-aromatic polyamides can be copolymerized with a lactam or an amino acid to give structures such as PA11/9T, PA11/10T, PA11/12T, PA12/9T, PA12/10T and PA12/12T or PA11/MXD6, PA11/MXD10, PA12/MXD6, and PA12/MXD10.

Advantageously, said composition of the layer (1) comprises at least 60% by weight, especially at least 70% by weight, in particular at least 80% by weight, more particularly at least 90% by weight of polyamide resins consisting of at least one first polyamide resin predominantly comprising aliphatic units and of at least one second resin predominantly comprising aromatic units, relative to the total weight of said composition.

Said composition of the layer (1) consists of at least 50% recycled material from a multi-layer tube that has been used to transport fluids for a motor vehicle.

This means either that the "at least one predominant polyamide" of said composition corresponds in its totality to what is called "at least 50% recycled material" or that at least 50% by weight of the totality of the constituents of the composition are of recycled origin coming from multilayer tube.

The recycled material may be from a multilayer tube, said multilayer tubes having been intended for automotive fluid transport. Said tube is therefore a used tube, i.e. it has been used for at least one year to transport said fluid defined above.

Said multilayer tube comprises at least one layer consisting of a composition comprising a semi-crystalline aliphatic polyamide and optionally impact modifiers and/or additives, and at least one layer comprising a blend of semi-crystalline aliphatic and semi-crystalline aromatic polyamide and optionally impact modifiers and/or additives. It can therefore also comprise other layers made of a thermoplastic polymer other than a semi-crystalline aliphatic polyamide or a mixture of semi-crystalline aliphatic and semi-crystalline aromatic polyamide, such as, for example, polypropylene, semi-aromatic polyamide or poly ethylene vinyl alcohol (EVOH).

It is also clear that the multilayer tube can also be a blend of different types of multilayer tube, provided that at least one of the layers of one of the types of multilayer tube consists of a semi-crystalline aliphatic polyamide.

If the mixed tubes are incompatible with each other, then the addition of a second semi-crystalline aliphatic polyamide denoted B and having an average number of carbon atoms per nitrogen atom denoted $C_B=C_C-1$, preferably $C_B=C_C-2$, and preferably a third polyamide makes it possible to make them compatible.

Said multilayer tube, which has been used to transport fluids for motor vehicles and is therefore used, can undergo several different treatments in order to be recycled:

It can be simply shredded;
It can be shredded and recompounded, i.e. after shredding, the shredded particles are fed into an extruder, especially of the co-rotating twin-screw type, or of the co-mixer (Buss) type, where they are remixed by melting. The molten material comes out of the extruder in rods which are cooled and cut into pellets;
It can be shredded and recompounded and reformulated, i.e. after shredding, the shredded particles are fed into an extruder, as defined above, where they are remixed by melting with the addition of at least one compound selected from a semi-crystalline aliphatic polyamide, of recycled or non-recycled origin, of at least one impact modifier, of a plasticizer, of an additive and of antistatic charges. The molten material comes out of the extruder in rods which are cooled and cut into pellets.

Optionally, the multilayer tube that has been intended for the transport of fluid for motor vehicles undergoes a washing and/or cleaning step before shredding.

Optionally, the shredded tube undergoes a washing and/or cleaning step after shredding.

Optionally, the multilayer tube that has been intended for the transport of fluid for motor vehicles undergoes a washing and/or cleaning step prior to shredding and is then optionally subjected to a washing and/or cleaning step after shredding prior to recompounding.

The cleaning step can be carried out, for example, in a vacuum.

In one embodiment, said composition of the layer (1) comprises: at least 50% by weight, in particular from 50% to 99% by weight, especially from 50% to 98% by weight, of at least one semi-crystalline aliphatic polyamide denoted C having an average number of carbon atoms per nitrogen atom denoted $C_C$ of between 6 and 18, advantageously from 8 to 12;
from 0 to 50% by weight of at least one semi-crystalline aliphatic polyamide denoted B and having an average number of carbon atoms per nitrogen atom denoted $C_B=C_C-1$, preferably $C_B=C_C-2$;
from 0 to 50% by weight of a semi-crystalline aliphatic polyamide denoted A having an average number of carbon atoms per nitrogen atom denoted $C_A=C_B-1$, preferably $C_A=C_B-2$;
from 0 to 45% by weight of at least one impact modifier, in particular 1 to 45% by weight of at least one impact modifier, especially 2 to 45% by weight of at least one impact modifier,
from 0 to 20% by weight of at least one plasticizer,
from 0 to 2% by weight of at least one additive,
the sum of the constituents being equal to 100%.

In another embodiment, said composition of the layer (1) consists of:
at least 50% by weight, in particular from 50% to 99% by weight, especially from 50% to 98% by weight, of at least one semi-crystalline aliphatic polyamide denoted C having an average number of carbon atoms per nitrogen atom denoted $C_C$ of between 6 and 18, advantageously from 8 to 12;
from 0 to 25% by weight of at least one semi-crystalline aliphatic polyamide denoted B and having an average number of carbon atoms per nitrogen atom denoted $C_B=C_C-1$, preferably $C_B=C_C-2$;
from 0 to 25% by weight of a semi-crystalline aliphatic polyamide denoted A having an average number of carbon atoms per nitrogen atom denoted $C_A=C_B-1$, preferably $C_A=C_B-2$;
from 0 to 45% by weight of at least one impact modifier, in particular 1 to 45% by weight of at least one impact modifier, especially 2 to 45% by weight of at least one impact modifier,
from 0 to 20% of at least one plasticizer,
from 0 to 2% by weight of at least one additive,
the sum of the constituents being equal to 100%.

The polyamides denoted A, B and C can be of recycled or non-recycled origin provided that the composition of the layer (1) consists of at least 50% recycled material.

Advantageously, the Tm of the predominant aliphatic semi-crystalline polyamide of the layer (1) is ≤225° C., in particular ≤200° C., as determined according to ISO 11357-3: 2013, at a heating rate of 20 K/min.

In one embodiment, said composition of the layer (1) lacks plasticizer and/or impact modifier and said recycled material comes from a tube selected from a shredded tube, a shredded and recompounded tube and a shredded, recompounded, and reformulated tube.

In another embodiment, said composition of the layer (1) comprises at least one compound selected from a plasticizer, an impact modifier, and an additive, and said recycled material is selected from a shredded, then recompounded and reformulated tube.

In one embodiment, the fluid transported by said multi-layer tube is different from that of said multilayer tubular structure (MLT).

This means that if the multi-layer tube carried a fluid such as air, said multi-layer tube structure (MLT) may be intended to transport gasoline, or if the multi-layer tube transported a fluid such as alcoholized gasoline, said multi-layer tube structure (MLT) may be intended to transport diesel.

In another embodiment, the fluid transported by said multilayer tube is the same as that of said multilayer tubular structure (MLT).

This means that if the multilayer tube has carried a fluid such as gasoline, said tubular structure (MLT) may be intended to carry gasoline provided that the gasoline of the multilayer tube and said multilayer tubular structure (MLT) is the same, e.g., alcoholized gasoline.

Advantageously, the recycled material comes from a multilayer tube such as PA11/PPA9T and PA12/PPA9T or PA11/MXD6 and PA12/MXD6.

In one embodiment, said composition of the layer (1) comprises at least 60% by weight, especially at least 70% by weight, especially at least 80% by weight, in particular at least 90% by weight, more particularly at least 95% of recycled material.

In another embodiment, said composition of the layer (1) consists of 100% by weight of recycled material.

Recycled Used Multilayer Tube

In a first variant, said tube that was intended for transporting fluid for motor vehicles is multilayer and simply shredded and the composition of the resulting layer (1) of said recycling consists of:
at least 61% by weight, in particular from 96% to 99% by weight, especially from 96% to 98% by weight, of at least one semi-crystalline aliphatic polyamide denoted C having an average number of carbon atoms per nitrogen atom denoted $C_C$ of between 6 and 18, advantageously from 8 to 12, and of at least one semi-crystalline semi-aromatic polyamide;
from 0 to 2% of at least one plasticizer,
from 0 to 2% by weight of at least one additive, in particular a stabilizer;
the sum of the constituents being equal to 100%.

Advantageously, in this first variant, the semi-crystalline aliphatic polyamide denoted C is chosen from PA612, PA1012, PA1010, PA11 and PA12, in particular PA11 and the semi-crystalline semi-aromatic polyamide is chosen from PA9T, PA10T, PA12T, MXD6 and MXD10.

Advantageously in this first variant, said tube was intended for the transport of fuel such as gasoline, in particular alcoholized gasoline, bio-gasoline or diesel, in particular bio-diesel.

Advantageously, in this first variant, the semi-crystalline aliphatic polyamide denoted C is chosen from PA612, PA1012, PA1010, PA11 and PA12, in particular PA11 and the semi-crystalline semi-aromatic polyamide is chosen from PA9T, PA10T, PA12T, MXD6 and MXD10 and said tube was intended for the transport of fuel such as gasoline, in particular alcoholized gasoline, bio-gasoline or diesel, in particular bio-diesel.

In a second variant, said tube which was intended for transporting fluid for motor vehicles is multilayer, and is shredded and recompounded, and the composition of the layer (1) resulting from said recycling consists of:
at least 61% by weight, in particular from 96% to 99% by weight, especially from 96% to 98% by weight, of at least one semi-crystalline aliphatic polyamide denoted C having an average number of carbon atoms per nitrogen atom denoted $C_C$ of between 6 and 18, advantageously from 8 to 12, and of at least one semi-crystalline semi-aromatic polyamide;
from 0 to 2% of at least one plasticizer,
from 0 to 2% by weight of at least one additive, in particular a stabilizer;
the sum of the constituents being equal to 100%.

Advantageously, in this second variant, the semi-crystalline aliphatic polyamide denoted C is chosen from PA612, PA1012, PA1010, PA11 and PA12, in particular PA11 and the semi-crystalline semi-aromatic polyamide is chosen from PA9T, PA10T, PA12T, MXD6 and MXD10.

Advantageously in this second variant, said tube was intended for the transport of fuel such as gasoline, in particular alcoholized gasoline, bio-gasoline or diesel, in particular bio-diesel.

Advantageously, in this second variant, the semi-crystalline aliphatic polyamide denoted C is chosen from PA612, PA1012, PA1010, PA11 and PA12, in particular PA11 and the semi-crystalline semi-aromatic polyamide is chosen from PA9T, PA10T, PA12T, MXD6 and MXD10 and said tube was intended for the transport of fuel such as gasoline, in particular alcoholized gasoline, bio-gasoline or diesel, in particular bio-diesel.

In a third variant, said tube that was intended for transporting fluid for motor vehicles is multilayer, and is shredded, recompounded, and reformulated, and the composition of the layer (1) resulting from said recycling and reformulation consists of:
at least 58.5% by weight of at least one semi-crystalline aliphatic polyamide denoted C having an average number of carbon atoms per nitrogen atom denoted $C_C$ of between 6 and 18, advantageously from 8 to 12, and of at least one semi-crystalline semi-aromatic polyamide;
from 6 to 14% of at least one plasticizer, particularly from 6 to 8%;
from 0.5 to 1.5% by weight of at least one additive, in particular a stabilizer;
the sum of the constituents being equal to 100%.

Advantageously, in this third variant, the semi-crystalline aliphatic polyamide denoted C is chosen from PA612, PA1012, PA1010, PA11 and PA12, in particular PA11 and the semi-crystalline semi-aromatic polyamide is chosen from PA9T, PA10T, PA12T, MXD6 and MXD10.

Advantageously in this third variant, said tube was intended for the transport of fuel such as gasoline, in particular alcoholized gasoline, bio-gasoline or diesel, in particular bio-diesel.

Advantageously, in this third variant, the semi-crystalline aliphatic polyamide denoted C is chosen from PA612, PA1012, PA1010, PA11 and PA12, in particular PA11 and the semi-crystalline semi-aromatic polyamide is chosen from PA9T, PA10T, PA12T, MXD6 and MXD10 and said tube was intended for the transport of fuel such as gasoline, in particular alcoholized gasoline, bio-gasoline or diesel, in particular bio-diesel.

In a fourth variant, said tube that was intended for transporting fluid for motor vehicles is multilayer, and is shredded, recompounded, and reformulated, and the composition of the layer (1) resulting from said recycling and reformulation consists of:
at least 58% by weight of at least one semi-crystalline aliphatic polyamide denoted C having an average number of carbon atoms per nitrogen atom denoted $C_C$ of between 6 and 18, advantageously from 8 to 12, and of at least one semi-crystalline semi-aromatic polyamide;

from 6 to 14% of at least one plasticizer, particularly from 6 to 8%;

from 1 to 2% by weight of at least one additive, in particular a stabilizer and a catalyst;

the sum of the constituents being equal to 100%.

Advantageously, in this fourth variant, the semi-crystalline aliphatic polyamide denoted C is chosen from PA612, PA1012, PA1010, PA11 and PA12, in particular PA11 and the semi-crystalline semi-aromatic polyamide is chosen from PA9T, PA10T, PA12T, MXD6 and MXD10.

Advantageously in this fourth variant, said tube was intended for the transport of fuel such as gasoline, in particular alcoholized gasoline, bio-gasoline or diesel, in particular bio-diesel.

Advantageously, in this fourth variant, the semi-crystalline aliphatic polyamide denoted C is chosen from PA612, PA1012, PA1010, PA11 and PA12, in particular PA11 and the semi-crystalline semi-aromatic polyamide is chosen from PA9T, PA10T, PA12T, MXD6 and MXD10 and said tube was intended for the transport of fuel such as gasoline, in particular alcoholized gasoline, bio-gasoline or diesel, in particular bio-diesel.

Advantageously, the composition is degassed during compounding, even more advantageously the degassing is located just after the melting zone, and before the zone where the plasticizer, such as BBSA or other, is introduced.

In a fifth variant, said tube that was intended for transporting fluid for motor vehicles is multilayer, and is shredded, recompounded, and reformulated, and the composition of the layer (1) resulting from said recycling and reformulation consists of:

at least 50% by weight, in particular from 50% to 99% by weight, especially from 50% to 98% by weight, of at least one semi-crystalline aliphatic polyamide denoted C having an average number of carbon atoms per nitrogen atom denoted $C_C$ of between 6 and 18, advantageously from 8 to 12, and of at least one semi-crystalline semi-aromatic polyamide;

from 0 to 25% by weight of at least one semi-crystalline aliphatic polyamide denoted B and having an average number of carbon atoms per nitrogen atom denoted $C_B=C_C-1$, preferably $C_B=C_C-2$;

from 0 to 25% by weight of a semi-crystalline aliphatic polyamide denoted A having an average number of carbon atoms per nitrogen atom denoted $C_A=C_B-1$, preferably $C_A=C_B-2$;

from 0 to 2% of at least one plasticizer, from 0 to 2% by weight of at least one additive, the sum of the constituents being equal to 100%.

Advantageously, in this fifth variant, the semi-crystalline aliphatic polyamide denoted C is chosen from PA612, PA1012, PA1010, PA11 and PA12, in particular PA11 and the semi-crystalline semi-aromatic polyamide is chosen from PA9T, PA10T, PA12T, MXD6 and MXD10.

Advantageously in this fifth variant, said tube was intended for the transport of fuel such as gasoline, in particular alcoholized gasoline, bio-gasoline or diesel, in particular bio-diesel.

Advantageously, in this fifth variant, the semi-crystalline aliphatic polyamide denoted C is chosen from PA612, PA1012, PA1010, PA11 and PA12, in particular PA11 and the semi-crystalline semi-aromatic polyamide is chosen from PA9T, PA10T, PA12T, MXD6 and MXD10 and said tube was intended for the transport of fuel such as gasoline, in particular alcoholized gasoline, bio-gasoline or diesel, in particular bio-diesel.

In a sixth variant, said tube which was intended for transporting fluid for motor vehicles is multilayer, and is shredded, recompounded, and reformulated, and the composition of the layer (1) resulting from said recycling and reformulation consists of:

at least 55% by weight, in particular from 55% to 99% by weight, especially from 55% to 98% by weight, of at least one semi-crystalline aliphatic polyamide denoted C having an average number of carbon atoms per nitrogen atom denoted $C_C$ of between 6 and 18, advantageously from 8 to 12, and of at least one semi-crystalline semi-aromatic polyamide;

from 0 to 45% by weight of at least one impact modifier, in particular 1 to 45% by weight of at least one impact modifier, especially 2 to 45% by weight of at least one impact modifier, the sum of the constituents being equal to 100%.

Advantageously, in this sixth variant, the semi-crystalline aliphatic polyamide denoted C is chosen from PA612, PA1012, PA1010, PA11 and PA12, in particular PA11 and the semi-crystalline semi-aromatic polyamide is chosen from PA9T, PA10T, PA12T, MXD6 and MXD10.

Advantageously in this sixth variant, said tube was intended for the transport of fuel such as gasoline, in particular alcoholized gasoline, bio-gasoline or diesel, in particular bio-diesel.

Advantageously, in this sixth variant, the semi-crystalline aliphatic polyamide denoted C is chosen from PA612, PA1012, PA1010, PA11 and PA12, in particular PA11 and the semi-crystalline semi-aromatic polyamide is chosen from PA9T, PA10T, PA12T, MXD6 and MXD10 and said tube was intended for the transport of fuel such as gasoline, in particular alcoholized gasoline, bio-gasoline or diesel, in particular bio-diesel.

In a seventh variant, said tube that was intended for transporting fluid for motor vehicles is multilayer, and is shredded, recompounded, and reformulated, and the composition of the layer (1) resulting from said recycling and reformulation consists of:

at least 50% by weight of at least one semi-crystalline aliphatic polyamide denoted C having an average number of carbon atoms per nitrogen atom denoted $C_C$ of between 6 and 18, advantageously from 8 to 12, and of at least one semi-crystalline semi-aromatic polyamide;

from 0 to 43.5% by weight of at least one impact modifier, in particular from 1 to 43.5% by weight of at least one impact modifier, especially from 2 to 43.5% by weight of at least one impact modifier, from 6 to 14% of at least one plasticizer, particularly from 6 to 8%;

from 0.5 to 1.5% by weight of at least one additive, in particular a stabilizer;

the sum of the constituents being equal to 100%.

Advantageously, in this seventh variant, the semi-crystalline aliphatic polyamide denoted C is chosen from PA612, PA1012, PA1010, PA11 and PA12, in particular PA11 and the semi-crystalline semi-aromatic polyamide is chosen from PA9T, PA10T, PA12T, MXD6 and MXD10.

Advantageously in this seventh variant, said tube was intended for the transport of fuel such as gasoline, in particular alcoholized gasoline, bio-gasoline or diesel, in particular bio-diesel.

Advantageously, in this seventh variant, the semi-crystalline aliphatic polyamide denoted C is chosen from PA612, PA1012, PA1010, PA11 and PA12, in particular PA11 and the semi-crystalline semi-aromatic polyamide is chosen from PA9T, PA10T, PA12T, MXD6 and MXD10 and said tube was intended for the transport of fuel such as gasoline, in particular alcoholized gasoline, bio-gasoline or diesel, in particular bio-diesel.

In an eighth variant, said tube which was intended for transporting fluid for motor vehicles is multilayer, and is shredded, recompounded, and reformulated, and the composition of the layer (1) resulting from said recycling and reformulation consists of:

- at least 50% by weight of at least one semi-crystalline aliphatic polyamide denoted C having an average number of carbon atoms per nitrogen atom denoted $C_C$ of between 6 and 18, advantageously from 8 to 12, and of at least one semi-crystalline semi-aromatic polyamide;
- from 0 to 43% by weight of at least one impact modifier, in particular from 1 to 43% by weight of at least one impact modifier, especially from 2 to 38% by weight of at least one impact modifier,
- from 6 to 14% of at least one plasticizer, particularly from 6 to 8%;
- from 1 to 2% by weight of at least one additive, in particular a stabilizer and a catalyst;
- the sum of the constituents being equal to 100%.

Advantageously, in this eighth variant, the semi-crystalline aliphatic polyamide denoted C is chosen from PA612, PA1012, PA1010, PA11 and PA12, in particular PA11 and the semi-crystalline semi-aromatic polyamide is chosen from PA9T, PA10T, PA12T, MXD6 and MXD10.

Advantageously in this eighth variant, said tube was intended for the transport of fuel such as gasoline, in particular alcoholized gasoline, bio-gasoline or diesel, in particular bio-diesel.

Advantageously, in this eighth variant, the semi-crystalline aliphatic polyamide denoted C is chosen from PA612, PA1012, PA1010, PA11 and PA12, in particular PA11 and the semi-crystalline semi-aromatic polyamide is chosen from PA9T, PA10T, PA12T, MXD6 and MXD10 and said tube was intended for the transport of fuel such as gasoline, in particular alcoholized gasoline, bio-gasoline or diesel, in particular bio-diesel.

In a ninth variant, said tube that was intended for transporting fluid for motor vehicles is multilayer, and is shredded, recompounded, and reformulated, and the composition of the layer (1) resulting from said recycling and reformulation consists of:

- at least 50% by weight of at least one semi-crystalline aliphatic polyamide denoted C having an average number of carbon atoms per nitrogen atom denoted $C_C$ of between 6 and 18, advantageously from 8 to 12, and of at least one semi-crystalline semi-aromatic polyamide;
- from 0 to 25% by weight of at least one semi-crystalline aliphatic polyamide denoted B and having an average number of carbon atoms per nitrogen atom denoted $C_B = C_C - 1$, preferably $C_B = C_C - 2$;
- from 0 to 25% by weight of a semi-crystalline aliphatic polyamide denoted A having an average number of carbon atoms per nitrogen atom denoted $C_A = C_B - 1$, preferably $C_A = C_B - 2$;
- from 0 to 43% by weight of at least one impact modifier, in particular from 1 to 43% by weight of at least one impact modifier, especially from 2 to 38% by weight of at least one impact modifier,
- from 0 to 20% of at least one plasticizer,
- from 0 to 2% by weight of at least one additive,
- the sum of the constituents being equal to 100%.

Advantageously, in this ninth variant, the semi-crystalline aliphatic polyamide denoted C is chosen from PA612, PA1012, PA1010, PA11 and PA12, in particular PA11 and the semi-crystalline semi-aromatic polyamide is chosen from PA9T, PA10T, PA12T, MXD6 and MXD10.

Advantageously in this ninth variant, said tube was intended for the transport of fuel such as gasoline, in particular alcoholized gasoline, bio-gasoline or diesel, in particular bio-diesel.

Advantageously, in this ninth variant, the semi-crystalline aliphatic polyamide denoted C is chosen from PA612, PA1012, PA1010, PA11 and PA12, in particular PA11 and the semi-crystalline semi-aromatic polyamide is chosen from PA9T, PA10T, PA12T, MXD6 and MXD10 and said tube was intended for the transport of fuel such as gasoline, in particular alcoholized gasoline, bio-gasoline or diesel, in particular bio-diesel.

Regarding the Impact Modifier

The impact modifier advantageously consists of a polymer with a flexural modulus below 100 MPa measured according to standard ISO 178:2010, determined at 23° C. with relative humidity: RH50%, and Tg below 0° C. (measured according to ISO 11357-2:2013 at the inflection point of the DSC thermogram, at a heating rate of 20 K/min), in particular a polyolefin.

The polyolefin of the impact modifier may be functionalized or non-functionalized or be a mixture of at least one functionalized polyolefin and/or least one non-functionalized polyolefin. To simplify, the polyolefin is denoted (B) and functionalized polyolefins (B1) and non-functionalized polyolefins (B2) are described below.

A non-functionalized polyolefin (B2) is classically a homopolymer or copolymer of alpha-olefins or diolefins, such as for example, ethylene, propylene, 1-butene, 1-octene, butadiene. By way of example, mention may be made of:

- the homopolymers and copolymers of polyethylene, particularly LDPE, HDPE, LLDPE (linear low-density polyethylene), VLDPE (very low density polyethylene) and metallocene polyethylene.
- homopolymers or copolymers of propylene.
- ethylene/alpha-olefin copolymers such as ethylene/propylene, EPR (abbreviation for ethylene-propylene-rubber) and ethylene/propylene/diene (EPDM).
- styrene/ethylene-butene/styrene (SEBS), styrene/butadiene/styrene (SBS), styrene/isoprene/styrene (SIS), styrene/ethylene-propylene/styrene (SEPS) block copolymers.
- copolymers of ethylene with at least one product chosen from the salts or esters of unsaturated carboxylic acids such as alkyl (meth)acrylate (for example methyl acrylate), or the vinyl esters of saturated carboxylic acids such as vinyl acetate (EVA), where the proportion of comonomer can reach 40% by weight.

The functionalized polyolefin (B1) may be a polymer of alpha-olefins having reactive units (functionalities); such reactive units are acid, anhydride, or epoxy functions. By way of example, mention may be made of the preceding polyolefins (B2) grafted or co- or ter-polymerized by unsaturated epoxides such as glycidyl (meth)acrylate, or by carboxylic acids or the corresponding salts or esters such as (meth)acrylic acid (which can be completely or partially neutralized by metals such as Zn, etc.) or even by carboxylic acid anhydrides such as maleic anhydride. A functionalized polyolefin is for example a PE/EPR mixture, the ratio by weight whereof can vary widely, for example between 40/60 and 90/10, said mixture being co-grafted with an anhydride, especially maleic anhydride, according to a graft rate for example of 0.01 to 5% by weight.

The functionalized polyolefin (B1) may be chosen from the following, maleic anhydride or glycidyl methacrylate grafted, (co)polymers wherein the graft rate is for example from 0.01 to 5% by weight:

- of PE, of PP, of copolymers of ethylene with propylene, butene, hexene, or octene containing for example from 35 to 80% by weight of ethylene;
- ethylene/alpha-olefin copolymers such as ethylene/propylene, EPR (abbreviation for ethylene-propylene-rubber) and ethylene/propylene/diene (EPDM).
- styrene/ethylene-butene/styrene (SEBS), styrene/butadiene/styrene (SBS), styrene/isoprene/styrene (SIS), styrene/ethylene-propylene/styrene (SEPS) block copolymers.
- ethylene and vinyl acetate copolymers (EVA), containing up to 40% by weight of vinyl acetate;
- ethylene and alkyl (meth)acrylate copolymers, containing up to 40% by weight of alkyl (meth)acrylate;
- ethylene and vinyl acetate (EVA) and alkyl (meth)acrylate copolymers, containing up to 40% by weight of comonomers.

The functionalized polyolefin (B1) may also be selected from ethylene/propylene copolymers with predominantly maleic anhydride grafted propylene then condensed with a mono-amine polyamide (or a polyamide oligomer) (products described in EP-A-0,342,066).

The functionalized polyolefin (B1) may also be a co- or terpolymer of at least the following units: (1) ethylene, (2) alkyl (meth)acrylate or vinyl ester of saturated carboxylic acid and (3) anhydride such as maleic anhydride or (meth) acrylic acid or epoxy such as glycidyl (meth)acrylate.

By way of example of functionalized polyolefins of the latter type, mention may be made of the following copolymers, where ethylene represents preferably at least 60% by weight and where the termonomer (the function) represents for example from 0.1 to 10% by weight of the copolymer:

- ethylene/alkyl (meth)acrylate/(meth)acrylic acid or maleic anhydride or glycidyl methacrylate copolymers;
- ethylene/vinyl acetate/maleic anhydride or glycidyl methacrylate copolymers;
- ethylene/vinyl acetate or alkyl (meth)acrylate/(meth) acrylic acid or maleic anhydride or glycidyl methacrylate copolymers.

In the preceding copolymers, (meth)acrylic acid can be salified with Zn or Li.

The term "alkyl (meth)acrylate" in (B1) or (B2) denotes C1 to C8 alkyl methacrylates and acrylates, and may be chosen from methyl acrylate, ethyl acrylate, n-butyl acrylate, isobutyl acrylate, 2-ethyl-hexyl acrylate, cyclohexyl acrylate, methyl methacrylate and ethyl methacrylate.

Moreover, the previously cited polyolefins (B1) may also be crosslinked by any appropriate method or agent (diepoxy, diacid, peroxide, etc.); the term functionalized polyolefin also comprises mixtures of the previously cited polyolefins with a difunctional reagent such as a diacid, dianhydride, diepoxy, etc. that can react with these or mixtures of at least two functionalized polyolefins that can react together.

The copolymers mentioned above, (B1) and (B2), may be copolymerized in a statistical or sequenced way and have a linear or branched structure.

The molecular weight, the index MFI, the density of these polyolefins may also vary widely, which the person skilled in the art will know. MFI, abbreviation for Melt Flow Index, is a measure of fluidity in the molten state. It is measured according to standard ASTM 1238.

Advantageously the non-functionalized polyolefins (B2) are selected from homopolymers or copolymers of polypropylene and any ethylene homopolymer or ethylene copolymer and a higher alpha-olefin comonomer such as butene, hexene, octene or 4-methyl-1-pentene. Mention may be made for example of PPs, high-density PEs, medium-density PEs, linear low-density PEs, low-density PEs, very low-density PEs. These polyethylenes are known by the person skilled in the art as being produced according to a "free-radical" method, according to a "Ziegler" catalysis method, or, more recently, a so-called "metallocene" catalysis.

Advantageously, the functionalized polyolefins (B1) are selected from any polymer comprising alpha-olefin units and units bearing polar reactive functions such as epoxy, carboxylic acid or carboxylic acid anhydride functions.

By way of examples of such polymers, mention may be made of terpolymers of ethylene, of alkyl acrylate and of maleic anhydride or of glycidyl methacrylate like Lotader® from the Applicant or polyolefins grafted by maleic anhydride like Orevac® from the Applicant and terpolymers of ethylene, alkyl acrylate and (meth)acrylic acid. Mention may also be made of homopolymers or copolymers of polypropylene grafted by a carboxylic acid anhydride then condensed with polyamides or monoamine polyamide oligomers.

Regarding the Additives

The additives optionally used in the compositions of the invention are the conventional additives used in polyamides and are well known to a person skilled in the art and are especially described in EP 2098580.

For instance, they are chosen from a catalyst, an antioxidant, a heat stabilizer, a UV absorber, a light stabilizer, a lubricant, an inorganic filler, a flame-retardant agent, a nucleating agent and a dye, reinforcing fibers, a wax, and mixtures thereof.

The term "catalyst" denotes a polycondensation catalyst such as a mineral or organic acid.

Advantageously, the proportion by weight of catalyst is comprised from around 50 ppm to about 5000 ppm, particularly from about 100 to about 3000 ppm relative to the total weight of the composition.

Advantageously, the catalyst is chosen from phosphoric acid (H3PO4), phosphorous acid (H3PO3), hypophosphorous acid (H3PO2), or a mixture thereof.

As an example, the stabilizer can be a UV stabilizer, an organic stabilizer or more generally a combination of organic stabilizers, such as a phenol antioxidant (for example of the type Irganox® 245 or 1098 or 1010 by Ciba-BASF), a phosphite antioxidant (for example Irgafos® 126 and Irgafos® 168 by Ciba-BASF) and optionally other stabilizers such as a HALS, which means Hindered Amine Light Stabilizer (for example Tinuvin® 770 by Ciba-BASF), an anti-UV (for example Tinuvin® 312 by Ciba), or a phosphorus-based stabilizer. Amine antioxidants such as Crompton's Naugard® 445 or polyfunctional stabilizers such as Clariant's Nylostab® S-EED can also be used.

This stabilizer may also be a mineral stabilizer, such as a copper-based stabilizer. Byway of example of such mineral stabilizers, mention may be made of halides and copper acetates. Secondarily, other metals such as silver may optionally be considered, but these are known to be less effective. These copper-based compounds are typically associated with alkali metal halides, particularly potassium.

Regarding the Plasticizer:

As an example, the plasticizers are selected from benzene sulfonamide derivatives, such as n-butylbenzenesulfonamide (BBSA); ethyl toluenesulfonamide or N-cyclohexyl toluenesulfonamide; hydroxybenzoic acid esters, such as 2-ethylhexyl parahydroxybenzoate and 2-decylhexyl parahydroxybenzoate; esters or ethers of tetrahydrofurfuryl alcohol, such as oligoethyleneoxytetrahydrofurfuryl alcohol; and esters of citric acid or of hydroxymalonic acid, such as oligoethyleneoxy malonate.

Using a mixture of plasticizers would not be outside the scope of the invention.

When additives are present in the composition, their proportion is advantageously from 1 to 20% by weight, especially from 5 to 15% by weight, preferentially from 5 to 12% by weight.

Regarding Antistatic Fillers

The antistatic fillers are for example selected from carbon black, graphite, carbon fibers, carbon nanotubes, in particular carbon black and carbon nanotubes.

Regarding Layer (2)

The terms "semi-crystalline polyamide" and "aliphatic" have the same definition as for layer (1).

Said at least one aliphatic semi-crystalline polyamide is obtained in the same manner as described above for layer (1).

In a first variant of layer (2), said layer (2) lacks impact modifiers.

In this case, the semi-crystalline aliphatic polyamide that is PA12 or PA612 or PA1010 is excluded from the composition which constitutes the layer (2).

In a second variant of the layer (2), said layer (2) comprises from 3 to 45% by weight of at least one impact modifier, in particular from 5 to 20% by weight of at least one impact modifier.

In one embodiment of this second variant, said layer (2) consists of a composition comprising:
- at least 50% by weight, especially from 50% to 97% by weight, in particular from 50% to 95% by weight, of at least one semi-crystalline aliphatic polyamide denoted D having an average number of carbon atoms per nitrogen atom denoted $C_D$ of between 6 and 18, advantageously from 9 to 15;
- from 0 to 25% by weight of at least one semi-crystalline aliphatic polyamide denoted E and having an average number of carbon atoms per nitrogen atom denoted $C_E=C_D-1$, preferably $C_E=C_D-2$;
- from 0 to 25% by weight of a semi-crystalline aliphatic polyamide denoted F having an average number of carbon atoms per nitrogen atom denoted $C_F=C_E-1$, preferably $C_F=C_E-2$;
- from 3 to 45% by weight of at least one impact modifier, in particular 5 to 20% by weight of at least one impact modifier;
- from 0 to 20% of at least one plasticizer;
- from 0 to 2% by weight of at least one additive,
- from 0 to 35% of at least one antistatic filler,
the sum of the constituents being equal to 100%.

In another embodiment of this second variant, said layer (2) consists of a composition consisting of:
- at least 50% by weight, especially from 50% to 97% by weight, by weight, in particular from 50% to 95% by weight, of at least one semi-crystalline aliphatic polyamide denoted D having an average number of carbon atoms per nitrogen atom denoted $C_D$ of between 6 and 18, advantageously from 9 to 15; from 0 to 25% by weight of at least one semi-crystalline aliphatic polyamide denoted E and having an average number of carbon atoms per nitrogen atom denoted $C_E=C_D-1$, preferably $C_E=C_D-2$;
- from 0 to 25% by weight of a semi-crystalline aliphatic polyamide denoted F having an average number of carbon atoms per nitrogen atom denoted $C_F=C_E-1$, preferably $C_F=C_E-2$;
- from 3 to 45% by weight of at least one impact modifier, in particular 5 to 20% by weight of at least one impact modifier;
- from 0 to 20% of at least one plasticizer;
- from 0 to 2% by weight of at least one additive,
- from 0 to 35% of at least one antistatic filler,
the sum of the constituents being equal to 100%.

Advantageously, the composition of said layer (2) comprises a PA11, a PA12 or a PA612 and from 3 to 45% by weight of an impact modifier, in particular from 5 to 20% by weight of an impact modifier.

Regarding Layer (2')

The terms "semi-crystalline polyamide" and "aliphatic" have the same definition as for layer (1) or layer (2).

Said at least one aliphatic semi-crystalline polyamide is obtained in the same manner as described above for layer (1) and layer (2).

In a first variant of layer (2'), said layer (2') lacks impact modifiers.

In a second variant of the layer (2'), said layer (2') comprises from 3 to 45% by weight of at least one impact modifier, in particular from 5 to 20% by weight of at least one impact modifier.

In one embodiment of this second variant, said layer (2') consists of a composition comprising:
- at least 50% by weight, especially from 50% to 97% by weight, in particular from 50% to 95% by weight, of at least one semi-crystalline aliphatic polyamide denoted D having an average number of carbon atoms per nitrogen atom denoted $C_D$ of between 6 and 18, advantageously from 9 to 15;
- from 0 to 25% by weight of at least one semi-crystalline aliphatic polyamide denoted E and having an average number of carbon atoms per nitrogen atom denoted $C_E=C_D-1$, preferably $C_E=C_D-2$;
- from 0 to 25% by weight of a semi-crystalline aliphatic polyamide denoted F having an average number of carbon atoms per nitrogen atom denoted $C_F=C_E-1$, preferably $C_F=C_E-2$;
- from 3 to 45% by weight of at least one impact modifier, in particular 5 to 20% by weight of at least one impact modifier;
- from 0 to 20% of at least one plasticizer;
- from 0 to 2% by weight of at least one additive,
- from 0 to 35% of at least one antistatic filler,
the sum of the constituents being equal to 100%.

In another embodiment of this second variant, said layer (2') consists of a composition consisting of:
- at least 50% by weight, especially from 50% to 97% by weight, by weight, in particular from 50% to 95% by weight, of at least one semi-crystalline aliphatic polyamide denoted D having an average number of carbon atoms per nitrogen atom denoted $C_D$ of between 6 and 18, advantageously from 9 to 15; from 0 to 25% by weight of at least one semi-crystalline aliphatic polyamide denoted E and having an average number of carbon atoms per nitrogen atom denoted $C_E=C_D-1$, preferably $C_E=C_D-2$;
- from 0 to 25% by weight of a semi-crystalline aliphatic polyamide denoted F having an average number of carbon atoms per nitrogen atom denoted $C_F=C_E-1$, preferably $C_F=C_E-2$;

from 3 to 45% by weight of at least one impact modifier, in particular 5 to 20% by weight of at least one impact modifier;

from 0 to 20% of at least one plasticizer;
from 0 to 2% by weight of at least one additive,
from 0 to 35% of at least one antistatic filler,
the sum of the constituents being equal to 100%.

Advantageously, the composition of said layer (2') comprises a PA11, a PA12 or a PA612 and from 3 to 45% by weight of at least one impact modifier, in particular from 5 to 20% by weight of at least one impact modifier.

Regarding the Structure

All the embodiments of the layer (1) described hereinbefore in the paragraph "regarding the layer (1)" can be used for the structure detailed in this part.

In one embodiment, said layer (1) is located between a layer (2) and a layer (2').

Advantageously, said layer (2') is the layer in contact with the transported fluid.

Advantageously, said layer (2') is as defined for layer (2), and preferably layers (2) and (2') are identical.

In this latter embodiment, said layer (2') is as defined for layer (2) means that the compositions of layer (2) and layer (2') may be the same or different.

When they are different, they may differ by the polyamide or by the proportion of polyamide or by one of the other constituents of the composition.

Advantageously, the composition of said layer (2) comprises a PA11, a PA12 or a PA612 and the recycled material comes from a multilayer tube consisting of a composition comprising a PA11 or a PA12 and a PA9T, PA10T, PA12T, PAMXD6 and PAMXD10, in particular the composition of the layer (1) consists of 100% recycled material.

Advantageously, the composition of said layer (2) comprises a PA11, a PA12 or a PA612 and the recycled material comes from a multilayer tube consisting of a composition comprising a PA11 or a PA12 and a PA9T, PA10T, PA12T, PAMXD6 and PAMXD10, in particular the composition of the layer (1) consists of 100% recycled material, and the composition of said layer (2') comprises a PA11, a PA12 or a PA612.

Advantageously, the composition of said layer (2) comprises a PA11, a PA12 or a PA612 and from 3 to 45% by weight of at least one impact modifier, in particular from 5 to 20% by weight of at least one impact modifier, and the recycled material comes from a multilayer tube consisting of a composition comprising a PA11 or a PA12 and a PA9T, PA10T, PA12T, PAMXD6 and PAMXD10, in particular the composition of the layer (1) consists of 100% recycled material.

Advantageously, the composition of said layer (2) comprises a PA11, a PA12 or a PA612 and from 3 to 45% by weight of at least one impact modifier, in particular from 5 to 20% by weight of at least one impact modifier, and the recycled material comes from a multilayer tube consisting of a composition comprising a PA11 or a PA12 and a PA9T, PA10T, PA12T, PAMXD6 and PAMXD10, in particular the composition of the layer (1) consists of 100% recycled material, and the composition of said layer (2') comprises a PA11, a PA12 or a PA612 and from 3 to 45% by weight of at least one impact modifier, in particular from 5 to 20% by weight of at least one impact modifier.

Advantageously, the compositions of the layer (2) and the layer (2') are identical and thus the layers (2) and (2') are obviously identical, i.e. both the polyamide and the other constituents of the composition are identical in nature and proportion and the thickness of the two layers (2) and (2') is identical. The layer (2') in such a case is a layer (2).

In a first variant of the multilayer tubular structure (MLT), it consists of three layers (2)/(1)/(2'), in particular (2)/(1)/(2).

In one embodiment, at least one binder layer (3) is present, said layer (3) being located between layer (2) and layer (1) and/or between layer (1) and layer (2').

In a second variant of the multilayer tubular structure (MLT), it consists of four layers (2)/binder (3)/(1)/(2'), in particular (2)/binder (3)/(1)/(2).

In a third variant of the multilayer tubular structure (MLT), it consists of four layers (2)/(1)/binder (3)/(2'), in particular (2)/(1)/binder (3)/(2).

In a fourth variant of the multilayer tubular structure (MLT), it consists of five layers (2)/binder (3)/(1)/binder (3)/(2'), in particular (2)/binder (3)/(1)/binder (3)/(2).

In this fourth variant, the two binder layers (3) can be identical or different, in particular they are identical.

In another embodiment, at least one layer of EVOH is present, said layer (3) being located between layer (1) and layer (2').

The multilayer tubular structure (MLT) in such a case consists of four layers (2)/(1)/EVOH/(2'), in particular (2)/(1)/EVOH/(2).

In one embodiment, said layer (1) represents at least 10%, in particular at least 30%, especially at least 50% of the total thickness of said multilayer tubular structure (MLT).

Advantageously, said layer (1) represents at least 60%, in particular at least 70% of the total thickness of said multilayer tubular structure (MLT).

In one embodiment of one of the four variants of the multilayer tubular structure (MLT) or the four-layer structure with EVOH, said composition of said layer (1) lacks polyamides denoted A and B and said composition of said layer (2) comprises polyamides selected from those denoted E, F and a mixture thereof.

In another embodiment of one of the four variants of the multilayer tubular structure (MLT) or the four-layer structure with EVOH, said composition of said layer (1) comprises polyamides selected from those denoted A, B and a mixture thereof, and said composition of said layer (2) lacks polyamides denoted E and F.

In yet another embodiment of one of the four variants of the multilayer tubular structure (MLT) or the four-layer structure with EVOH, said composition of said layer (1) comprises polyamides selected from those denoted A, B and a mixture thereof, and said composition of said layer (2) comprises selected from those denoted E, F and a mixture thereof.

In yet another embodiment of one of the four variants of the multilayer tubular structure (MLT) or the four-layer structure with EVOH, said composition of said layer (1) lacks polyamides selected from those denoted A and B, and said composition of said layer (2) lacks polyamides denoted E and F.

Advantageously, in these last four embodiments, the layer (1) comes from a recycled multilayer tube.

Advantageously, in these last four embodiments, the layer (1) comes from a recycled multilayer tube and only said composition of said layer (1) comprises at least one impact modifier.

Advantageously, in these last four embodiments, the layer (1) comes from a recycled multilayer tube and said composition of said layer (1) as well as said compositions of the layer (2) and of the layer (2') comprise at least one impact modifier.

In one embodiment, said multilayer tubular (MLT) is intended for the transport of fluids selected from a fuel such as gasoline, in particular alcoholized gasoline, bio-gasoline or diesel, in particular bio-diesel.

Regarding the Binder

The binder is especially described in patents EP1452307 and EP1162061, EP1216826, EP0428833, and EP3299165.

It is implicit that the layers (2) and (1) or (1) and (2') adhere to each other. The binder layer is intended to be inserted between two layers that do not adhere or have trouble adhering to each other.

The binder may be, for example, but without being limited thereto, a composition based on 50% of copolyamide 6/12 (ratio of 70/30 by weight) with an Mn of 16,000, and 50% of copolyamide 6/12 (ratio of 30/70 by weight) with an Mn of 16,000, a composition based on PP (polypropylene) grafter with maleic anhydride, known under the name of Admer QF551A from Mitsui, a composition based on PA610 (with an Mn of 30,000, and as otherwise defined) and 36% of PA6 (with an Mn of 28,000) and 1.2% of organic stabilizers (consisting of 0.8% of phenol Lowinox 44B25 from Great Lakes, 0.2% of phosphite Irgafos 168 from Ciba, 0.2% of anti-UV Tinuvin 312 from Ciba), a composition based on PA612 (with an Mn of 29,000, and as otherwise defined) and 36% of PA6 (with an Mn of 28,000, and as otherwise defined) and 1.2% of organic stabilizers (consisting of 0.8% of phenol Lowinox 44B25 from Great Lakes, of 0.2% of phosphite Irgafos 168 from Ciba, of 0.2% of anti-UV Tinuvin 312 from Ciba), a composition based on PA610 (with an Mn of 30,000, and as otherwise defined) and of 36% of PA12 (with an Mn of 35,000, and as otherwise defined) and of 1.2% of organic stabilizers (consisting of 0.8% of phenol Lowinox 44B25 from Great Lakes, of 0.2% of phosphite Irgafos 168 from Ciba, of 0.2% of anti-UV Tinuvin 312 from Ciba), a composition based on 40% PA6 (with an Mn of 28,000, and as otherwise defined), of 40% of PA12 (with an Mn of 35,000, and as otherwise defined) and of 20% of functionalized EPR Exxelor VA1801 (from Exxon) and of 1.2% of organic stabilizers (consisting of 0.8% of phenol Lowinox 44B25 from Great Lakes, of 0.2% of phosphite Irgafos 168 from Ciba, of 0.2% of anti-UV Tinuvin 312 from Ciba) or else a composition based on 40% PA6.10 (with an Mn of 30,000, and as otherwise defined), of 40% of PA6 (with an Mn of 28,000, and as otherwise defined) and of 20% of impact modifier, of the type ethylene/ethyl acrylate/anhydride in a weight ratio of 68.5/30/1.5 (MFI 6 at 190° C. under 2.16 kg), and of 1.2% of organic stabilizers (consisting of 0.8% of phenol Lowinox 44B25 from Great Lakes, of 0.2% of phosphite Irgafos 168 from Ciba, of 0.2% of anti-UV Tinuvin 312 from Ciba).

EXAMPLES

The following resins have been used in the various compositions of the invention:

PA11: Polyamide 11 of Mn (number-average molecular mass) 29000. The melting temperature is 190° C.; its melting enthalpy is 56 kJ/m2. The composition of this PA11 comprises 0.25% (+/−0.05%) of H3PO4.

PA12: Polyamide 12 of Mn (number-average molecular mass) 35000. The melting temperature is 178° C.; its melting enthalpy is 54 kJ/m2

PA12-B: Polyamide 12 of Mn (number-average molecular mass) 41000. The melting temperature is 178° C.; its melting enthalpy is 54 kJ/m2

PA1012: Polyamide 1012 of Mn (number-average molecular mass) 27000. The melting temperature is 190° C.; its melting enthalpy is 57 kJ/m2

PA612: Polyamide 612 of Mn (number-average molecular mass) 29000. The melting temperature is 218° C.; its melting enthalpy is 67 kJ/m2

PA610: Polyamide 610 of Mn (number-average molecular mass) 30000. The melting temperature is 223° C.; its melting enthalpy is 61 kJ/m2

PA6: Polyamide 6 of Mn (number-average molecular mass) 28000. The melting temperature is 220° C.; its melting enthalpy is 68 kJ/m2

The melting temperature and melting enthalpy were determined according to standard ISO 11357-3:2013.

The following additives, plasticizers and impact modifiers were used in the compositions of the invention:

stabilizer: stabilizer made of 80% phenol Lowinox 44B25 from Great Lakes, 20% phosphite Irgafos 168 from Ciba BBSA: plasticizer BBSA (benzyl butyl sulfonamide), Imod=generically designates a polyolefin or other type of impact modifier such as, inter alia, PEBA (polyether-block-amide), core-shell, silicones . . . .

Imod 1: Designates an EPR functionalized by a reactive group with anhydride function (at 0.5-1% by mass), of MFI 9 (at 230° C., below) 10 kg, of Exxellor VA1801 from Exxon.

Imod2: Ethylene/ethyl acrylate/anhydride impact modifier in 68.5/30/1.5 mass ratio and MFI 6 at 190° C. under 2.16 kg.

Imod3: Ethylene/butyl acrylate/anhydride impact modifier in 79/18/3 mass ratio and MFI 5 at 190° C. under 2.16 kg.

The Following Compositions were Used to Make the Tubes According to the Invention:

In the entire description, all the percentages are indicated by weight.

In the case of the compositions named "recy", "recy2" and "recy3" used for the layer (1) of the tubes of the invention or counterexample tubes, protocols to simulate an aged tube have been used:

Protocol A: The tube is (artificially) aged according to an easily reproducible model protocol that consists of placing it in air (in the presence of oxygen) at 150° C. for 96 h (4 days), in order to thermo-oxidize it. This model aging is representative of the average thermo-oxidation that tubes undergo in 10 years of service in a vehicle next to a hot engine.

The results obtained on impact, aging, flexural modulus, adhesion and elongation show that protocol A is representative of a reshredded gasoline tube.

Special protocols used during the (re)compounding of the aged tube.

After aging, the shredded tube can be recompounded in certain cases according to two protocols:

Protocol B: the reshredded tube is recompounded on a Coperion/Werner 40 mm bivision extruder, 70 kgh, 300 rpm, 270° C. set point, with degassing of −100 mmHg.

Protocol B2: the reshredded tube is recompounded on a Coperion/Werner 40 mm bivision extruder, 70 kgh, 300 rpm, 270° C. set point, with strong degassing of −660 mmHg.

The various compositions used for the preparation of the tubes of the invention are as follows:

PA11PL=PA11+7% BBSA+1% stabilizer
PA12PL=PA12+12% BBSA+1% stabilizer

PA11PL-recy=PA11PL tube aged according to protocol A, reshredded, and then recycled.

PA11PL-recy2=PA11PL tube aged according to protocol A, reshredded, recompounded according to protocol B2, and during this recompounding, adding 7% BBSA+0.5% stab, thereafter recycled PA11PL-recy+50% PA12PL-recy=a 50/50 mixture of PA11PL-recy and PA12PL-recy granules.

1012-recy=PA1012PL4 tube aged according to protocol A, reshredded, and thereafter recycled PA11PL4=PA11+12% BBSA+1% stabilizer PA12HIP-recy3=PA12HIPHL tube aged according to protocol A, reshredded, recompounded according to protocol B, and during this recompounding, adding 6% imod1, 9% BBSA and 1% stab; being thereafter intended to be recycled 11NX3=PA11+imod2 10%+PA610 5%+PA6 5%+BBSA 4%+stabilizer 1%

PA11 PL-recy+50% PA11 PL=a 50/50 mix of PA11 PL-recy and PA11 PL pellets, recycled and virgin material PA12HIPHL=PA12+6% imod1+10% BBSA+1% stabilizer PA12HIPHL-recy=PA12HIPHL tube aged according to protocol A, reshredded, and thereafter recycled PA12HIPHL-recy2=PA12HIPHL tube aged according to protocol A, reshredded, recompounded according to protocol B, and during this recompounding, adding 10% BBSA+0.5% stab, thereafter recycled PA12HIP-recy3=PA12HIPHL tube aged according to protocol A, reshredded, recompounded according to protocol B, and during this recompounding, adding 6% imod1, 9% BBSA and 1% stab; being thereafter intended to be recycled MLT-cx11-recy=MLT tube (11NX3//OHhi//11NX3 45//15//40%) aged according to protocol A, reshredded, recompounded according to protocol B, thereafter recycled MLT-cx21-recy=MLT tube (11NX3//MXD6hi 80/20%) aged according to protocol A, reshredded, recompounded according to protocol B, thereafter recycled MXD6hi=MXD6 impact-modified composition=composition based on a MXD6 type copolyamide with an impact modifier, marketed under the name BXT-2000 by Solvay. Its melting point is 237° C.

MLT-cx11-recy+20% MLTcx31-recy=is a mixture of 80% MLT-cx11-recy and 20% MLT-cx31-recy MLT-cx31-recy=MLT tube (PA12H12//PA11-recyNX3//PPA9T 15/60/25%) aged according to protocol A, reshredded, recompounded according to protocol B, thereafter recycled PA12H12=PA12-B+10% imod1+5% BBSA+1% stabilizer OHhi=impact-modified EVOH, marketed under the name EVAL LA170B by Eval-Kuraray These compositions are manufactured by conventional compounding in a co-rotating twin screw extruder like Coperion 40, at 300 rpm, at 270° C. (or at 300° C. when the ingredients have a melting point higher than 260° C.).

Multi-Layer Tubes of the Invention:

The layers are described from the outside to the inside, followed by their respective thicknesses indicated as %; the tubes are of dimension 8*1 mm Preparation of Multilayer Structures (Tubes):

The multi-layer tubes are manufactured by co-extrusion. An industrial Maillefer multilayer extrusion line is used, equipped with 5 extruders, connected to a multilayer extrusion head with spiral mandrels.

The screws used are extrusion monoscrews having screw profiles adapted to polyamides. In addition to the 5 extruders and the multilayer extrusion head, the extrusion line comprises:

a die-punch assembly, located at the end of the coextrusion head; the internal diameter of the die and the external diameter of the punch are selected according to the structure to be produced and the materials of which it is composed, as well as the dimensions of the tube and the line speed;

a vacuum tank with an adjustable vacuum level. In this tank water circulates generally maintained at 20° C., in which a gauge is submerged making it possible to shape the tube to its final dimensions. The diameter of the gauge is adapted to the dimensions of the tube to be produced, typically from 8.5 to 10 mm for a tube with an external diameter of 8 mm and a thickness of 1 mm;

a succession of cooling tanks in which water is maintained at around 20° C., allowing the tube to be cooled along the path from the head to the drawing bench;

a diameter meter, a drawing bench.

The configuration with 5 extruders is used to produce tubes ranging from 2 layers to 5 layers (and also one-layer tubes). In the case of structures whose number of layers is less than 5, several extruders are then fed with the same material.

Before the tests, in order to ensure the best properties for the tube and good extrusion quality, it is verified that the extruded materials have a residual moisture content before extrusion of less than 0.08%. Otherwise, an additional step of drying the material before the tests, generally in a vacuum dryer, is carried out overnight at 80° C.

The tubes, which satisfy the characteristics disclosed in the present patent application, were removed, after stabilization of the extrusion parameters, the dimensions of the tubes in question no longer changing over time. The diameter is controlled by a laser diameter meter installed at the end of the line.

The line speed is typically 20 m/min. It generally ranges from 5 to 100 m/min.

The screw speed of the extruders depends on the thickness of the layer and on the diameter of the screw as is known to those skilled in the art.

In general, the temperatures of the extruders and of the tools (head and connector) must be adjusted so as to be sufficiently higher than the melting temperature of the compositions in question, so that they remain in the molten state, thus preventing them from solidifying and jamming the machine.

The multi-layer tubes manufactured by extrusion above were then assessed according to a plurality of criteria:

Flex.: refers to the flexural modulus measured according to ISO178 at 23° C. on a tube conditioned at equilibrium in a 50% humidity climate and at 23° C.

We denote "+", for a flexibility that can be qualified as "good", which corresponds to <=1000 MPa and >500 MPa We denote "++", for a flexibility that can be qualified as "very good", which corresponds to <=500 MPa and >250 MPa Impact: Refers to impact type VW-40° C. standard VW TL52435 2010

We denote "++", for an impact performance that can be qualified as "very good", which corresponds to <=10% breakage.
We denote "+", for an impact performance that can be qualified as "good", which corresponds to <=25% breakage and >10% breakage
We denote "−", for an impact performance that can be qualified as "quite poor", which corresponds to <=75% breakage and >25% breakage
We denote "−−", for an impact performance that can be qualified as "very poor", which corresponds to >75%
Aging: this refers to durability, a.k.a. the resistance of the tube to oxidative aging in hot air. The tube is aged in air at 150° C., then impacted with an impact according to DIN 73378, this impact being carried out at −40° C., we indicate the half-life (in hours) which corresponds to the time at the end of which 50% of the tested tubes have broken. A qualitative comment accompanies this value.
We denote "++", for a durability that can be qualified as "very good", which corresponds to >=200 h of half-life.
We denote "+", for a durability (resistance to thermo-oxidative aging) that can be qualified as "good", which corresponds to >=100 h of half-life (and <200 h)
We denote "+−", for a durability (resistance to thermo-oxidative aging) that can be qualified as "acceptable", which corresponds to >=50 h of half-life (and <100 h)
We denote "−", for a durability (resistance to thermo-oxidative aging) that can be described as "poor", which corresponds to <50 h In the case where a half-life figure is given to show nuances, this figure is rounded off by 25 h increments, to take into account the significant figures, linked to the precision of the evaluation.

Adh.: this is the adhesion force. It is expressed in N/cm and measured on the tube of diameter 8 mm and thickness 1 mm having undergone a conditioning of >=15 days at 50% relative humidity at 23° C., such that the hygroscopic equilibrium is reached within the sample.

The value given is for the weakest interface, i.e. the least adherent of the multilayer, where the risk of delamination is therefore at its greatest. Peeling at the interface is performed by pulling one of the parts at an angle of 90° and at a speed of 50 mm/min according to the following method.

A 9 mm wide strip of tube is cut out. This strip is therefore tile-shaped and still has all the layers of the original tube. The separation of the two layers of the interface, which we want to evaluate with a knife, is initiated. Each of the layers thus separated is placed in the jaws of a pulling machine. The peeling is carried out by pulling these 2 layers on both sides at 180 degrees and at a speed of 50 mm/min. The belt, and thus the interface, is held at 90 degrees with respect to the direction of pull.
We Denote:
+++: very good, >50
++: good, >20 and <=50
+: fairly good (acceptable), >10 and <=20
− poor, <=10
El.%: this is the elongation at break according to the ISO R527 standard except that it is measured on a tube of 8 mm diameter and 1 mm thickness. The sample is ISO conditioned, i.e. conditioned for >=15 days at 50% relative humidity at 23° C. such that hygroscopic equilibrium is reached within the sample.
We Denote:
+++: very good, >=200% elongation
++: good, >=100 and <200% elongation
+: unsatisfactory: <100% elongation
The results are shown in Table 1.

TABLE 1

|  | Structure and thickness of the layers (as a % of the total thickness) | Impact | Aging | Flex. | Adh. | El. % |
|---|---|---|---|---|---|---|
| Example |  |  |  |  |  |  |
| Ex1 | 11NX3 //MLT-cx11-recy + 20% MLTcx31-recy// OHhi // 11NX3 15/30/15/40% | + | + | NT | ++ | +++ |
| Ex2 | PA12imod1 // MLTcx21-recy // PA12imod1 20/60/20% | ++ | + | NT | ++ | +++ |
| Ex3 | PA12imod1 //MLT-cx21-recy// MXD6hi // 11NX3 15 // 30 // 15 // 40% | + | + | NT | ++ | +++ |
| counter-examples |  |  |  |  |  |  |
| cx1 | PA12PL // PA12HIPHL-recy // PA12PL 15/70/15% | − | − | + | +++ | +++ |
| cx2 | PA12PL // PA12PL-recy // PA12PL 15/70/15% | −− | − | + | +++ | +++ |
| cx3 | PA12PL // PA11PL-recy // PA12PL 15/70/15% | − | − | + | +++ | +++ |
| cx4 | Monolayer PA12PL-recy | −− | − | + | NT | + |
| cx5 | monolayer PA11PL-recy | + | − | ++ | NT | + |
| cx6 | Monolayer PA11PL-recy2 | ++ | − | ++ | NT | ++ |
| cx7 | Monolayer PA12HIP-recy3 | + | − | ++ | NT | ++ |
| cx8 | Monolayer 1012-recy | − | − | + | NT | + |

NT: Not tested

The invention claimed is:

1. A multilayer tubular structure for transporting fluids for a motor vehicle, the structure comprising at least three layers:

at least one layer (1) consisting of a composition comprising at least 50% of polyamide resins consisting of at least one first polyamide resin predominantly comprising aliphatic units and at least one second resin predominantly comprising aromatic units, said composition consisting of at least 50% of recycled material from a multilayer tube that has transported fluids for a motor vehicle, said tube consisting of a composition that predominantly comprises at least one polyamide, at least one layer (2) consisting of a composition predominantly comprising at least one semi-crystalline aliphatic polyamide and optionally at least one impact modifier, and when the layer (2) consists of a composition predominantly comprising at least one semi-crystalline aliphatic polyamide that is PA12 and/or PA612 and/or PA1010, then said composition comprises said impact modifier, and at least one layer (2') consisting of a composition predominantly comprising at least one semi-crystalline aliphatic polyamide, said layer (2) and said layer (2') each consisting of at least 90% of non-recycled material.

2. The multilayer tubular structure according to claim 1, wherein said layer (1) is located between layer (2) and layer (2').

3. The multilayer tubular structure according to claim 1, wherein the layer (2') is the layer in contact with the fluid.

4. The multilayer tubular structure according to claim 1, wherein the layer (2') is as defined for layer (2).

5. The multilayer tubular structure according to claim 1, wherein at least one binder layer (3) is present, said layer (3) being located between layer (2) and layer (1) and/or between layer (1) and layer (2').

6. The multilayer tubular structure according to claim 1, wherein said layer (1) represents at least 10% of the total thickness of said multilayer tubular structure.

7. The multilayer tubular structure according to claim 1, wherein said layer (1) consists of a composition comprising:
at least 50% by weight of at least one semi-crystalline aliphatic polyamide denoted C having an average number of carbon atoms per nitrogen atom denoted $C_C$ of between 6 and 18;
from 0 to 25% by weight of at least one semi-crystalline aliphatic polyamide denoted B and having an average number of carbon atoms per nitrogen atom denoted $C_B=C_C-1$;
from 0 to 25% by weight of a semi-crystalline aliphatic polyamide denoted A having an average number of carbon atoms per nitrogen atom denoted $C_A=C_B-1$;
from 0 to 45% by weight of at least one impact modifier,
from 0 to 20% by weight of at least one plasticizer,
from 0 to 2% by weight of at least one additive,
the sum of the constituents being equal to 100%.

8. The multilayer tubular structure according to claim 1, wherein the fluid transported by said multilayer tube is the same as that of said multilayer tubular structure.

9. The multilayer tubular structure according to claim 1, wherein the fluid transported by said multilayer tube is different from that of said multilayer tubular structure.

10. The multilayer tubular structure according to claim 1, wherein the Tm of the predominant aliphatic semi-crystalline polyamide of layer (1) is ≤225° C., as determined by DSC according to ISO 11357-3:2013, at a heating rate of 20 K/min.

11. The multilayer tubular structure according to claim 1, wherein the predominant aliphatic semi-crystalline polyamide of layer (1) has a crystallization enthalpy ≥25 J/g, as determined by DSC according to ISO 11357-3:2013, at a heating rate of 20 K/min.

12. The multilayer tubular structure according to claim 1, wherein the MLT consists of the following three structure layers: (2)//(1)//(2).

13. The multilayer tubular structure of claim 1, wherein the recycled material comes from a multilayer tube selected from a shredded multilayer tube, a shredded and recompounded multilayer tube, and a shredded, recompounded and reformulated multilayer tube.

14. The multilayer tubular structure according to claim 13, wherein said composition of the layer (1) lacks plasticizers and/or impact modifiers and said recycled material comes from a multilayer tube selected from a shredded multilayer tube, a shredded and recompounded multilayer tube, and a shredded, recompounded and reformulated multilayer tube.

15. The multilayer tubular structure according to claim 13, wherein said composition of the layer (1) comprises at least one compound selected from plasticizer, impact modifier and additive, and said recycled material comes from a multilayer tube selected from a shredded, then recompounded and reformulated multilayer tube.

16. The multilayer tubular structure according to claim 1, wherein the layer (2) consists of a composition comprising:
at least 50% by weight, especially from 50% to 97% by weight of at least one semi-crystalline aliphatic polyamide denoted D having an average number of carbon atoms per nitrogen atom denoted $C_D$ of between 6 and 18;
from 0 to 50% by weight of at least one semi-crystalline aliphatic polyamide denoted E and having an average number of carbon atoms per nitrogen atom denoted $C_E=C_D-1$;
from 0 to 50% by weight of a semi-crystalline aliphatic polyamide denoted F having an average number of carbon atoms per nitrogen atom denoted $C_F=C_E-1$;
from 3 to 45% by weight of at least one impact modifier,
from 0 to 20% by weight of at least one plasticizer,
from 0 to 2% by weight of at least one additive,
from 0 to 35% of at least one antistatic filler,
the sum of the constituents being equal to 100%.

17. The multilayer tubular structure according to claim 16, wherein said composition of said layer (1) lacks polyamides denoted A and B and said composition of said layer (2) comprises polyamides selected from those denoted E, F, and a mixture thereof.

18. The multilayer tubular structure according to claim 17, wherein said composition of said layer (1) comprises polyamides selected from those denoted A, B, and a mixture thereof, and said composition of said layer (2) lacks polyamides denoted E and F.

19. The multilayer tubular structure according to claim 16, wherein the polyamide of layer (1) comes from a recycled multilayer tube.

* * * * *